(12) United States Patent
Denholm et al.

(10) Patent No.: US 11,907,875 B2
(45) Date of Patent: Feb. 20, 2024

(54) COLLABORATIVE DEVELOPMENT

(71) Applicant: INTERNATIONAL BUSINESS MACHINES CORPORATION, Armonk, NY (US)

(72) Inventors: Ashleigh Shona Denholm, Southampton (GB); Emma Jane Dawson, Eastleigh (GB); Jack Peter Wadsted, Southampton (GB); Samantha Catling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 16/675,313

(22) Filed: Nov. 6, 2019

(65) Prior Publication Data

US 2021/0133654 A1   May 6, 2021

(51) Int. Cl.
*G06Q 10/0631*    (2023.01)
*G06N 20/00*    (2019.01)
*G06F 40/211*    (2020.01)
*G06F 40/253*    (2020.01)
*G06F 40/232*    (2020.01)

(52) U.S. Cl.
CPC ..... *G06Q 10/06313* (2013.01); *G06F 40/211* (2020.01); *G06F 40/253* (2020.01); *G06N 20/00* (2019.01); *G06F 40/232* (2020.01)

(58) Field of Classification Search
None
See application file for complete search history.

(56) References Cited

U.S. PATENT DOCUMENTS

| | | |
|---|---|---|
| 5,675,802 A | 10/1997 | Allen |
| 5,678,052 A | 10/1997 | Brisson |
| 6,199,193 B1 | 3/2001 | Oyagi |
| 7,146,347 B1 | 12/2006 | Vazquez |
| 7,457,791 B1 | 11/2008 | Garg |
| 7,493,294 B2 | 2/2009 | Flinn |
| 7,559,057 B2 | 7/2009 | Castelli |
| 7,926,029 B1 | 4/2011 | Stoyen |
| 8,006,223 B2 | 8/2011 | Boulineau |
| 8,050,907 B2 | 11/2011 | Baisley |

(Continued)

OTHER PUBLICATIONS

Rücker de Bassi et al., Measuring Developers' Contribution in Source Code using Quality Metrics, 2018 IEEE 22nd International Conference on Computer Supported Cooperative Work in Design (CSCWD), Date of Conference: May 9-11, 2018 (Year: 2018).*

(Continued)

*Primary Examiner* — Chesiree A Walton
(74) *Attorney, Agent, or Firm* — Jordan T. Schiller (57) ABSTRACT

A collaborative development project having a plurality of contributors is provided. A first contributor of the plurality of contributors as an influencer of the collaborative development project. Contributions of the influencer to a sample project are analyzed to determine a development characteristic of the influencer. One or more development rules are then generated based on the determined development characteristic of the influencer. Further, a second contributor of the plurality of contributors may be identified as a follower of the development project. Identified contributions of the follower may then be modified based on the obtained one or more development rules.

18 Claims, 4 Drawing Sheets

(56) References Cited

U.S. PATENT DOCUMENTS

| | | | |
|---|---|---|---|
| 8,418,137 | B2 | 4/2013 | Hoche |
| 8,572,560 | B2 | 10/2013 | Drissi |
| 8,600,920 | B2 | 12/2013 | Flynn |
| 8,935,654 | B2 | 1/2015 | Sengupta |
| 8,977,689 | B2 | 3/2015 | Beaven |
| 9,330,257 | B2 | 5/2016 | Valencia |
| 9,535,664 | B1 | 1/2017 | Foster |
| 9,600,244 | B1 | 3/2017 | Hwang et al. |
| 10,528,741 | B1 * | 1/2020 | Collins .................. G06F 21/51 |
| 10,616,369 | B1 * | 4/2020 | d'Andrea ............ G06Q 10/109 |
| 10,691,726 | B2 | 6/2020 | Rapaport |
| 10,860,931 | B1 * | 12/2020 | Venter ..................... G06N 5/02 |
| 10,866,792 | B1 | 12/2020 | Tomlin |
| 11,093,238 | B2 | 8/2021 | Catling |
| 2011/0055799 | A1 | 3/2011 | Kaulgud |
| 2014/0136436 | A1 * | 5/2014 | Palmer ..................... G06F 7/00 |
| | | | 705/320 |
| 2016/0026648 | A1 | 1/2016 | Ghosh |
| 2016/0041953 | A1 | 2/2016 | Derose et al. |
| 2016/0196496 | A1 | 7/2016 | Chatterjee et al. |
| 2016/0371079 | A1 | 12/2016 | Balasubramanian |
| 2017/0220535 | A1 | 8/2017 | Olsen et al. |
| 2017/0236086 | A1 * | 8/2017 | Simon ............. G06Q 10/06375 |
| | | | 705/7.37 |
| 2017/0315903 | A1 | 11/2017 | David |
| 2021/0132939 | A1 | 5/2021 | Catling |

OTHER PUBLICATIONS

Hellendoorn et al., Will They Like This? Evaluating Code Contributions with Language Models, 2015 IEEE/ACM 12th Working Conference on Mining Software Repositories, Date of Conference: May 16-17, 2015 (Year: 2015).*

Cosentino, et al., "A Systematic Mapping Study of Software Development With GitHub," in IEEE Access, vol. 5, pp. 7173-7192, 2017 (Year: 2017).*

Gousios et al., "Work Practices and Challenges in Pull-Based Development: The Integrator's Perspective," 2015 IEEE/ACM 37th IEEE International Conference on Software Engineering, 2015, pp. 358-368, (Year: 2015).*

Markovtsev et al., Style-Analyzer: fixing code style inconsistencies with interpretable unsupervised algorithms; arXiv: 1904.00935 (Year: 2019).*

De Souza et al, "Management of Interdependencies in Collaborative Software Development", IEEE, pp. 1-10 (Year: 2003).

Goldman, "RoleBased Interfaces for Collaborative Software", ACM, pp. 23-26 (Year: 2011).

Hildenbrand et a, "Approaches to Collaborative Software Development", IEEE, pp. 523-528 (Year: 2008).

Layman, "Changing Students' Perceptions: An Analysis of the Supplementary Benefits of Collaborative Software Development", IEEE, pp. 1-8 (Year: 2006).

Mashayekhi et al, "Distributed, Collaborative Software Inspection", ACM, pp. 66-75 (Year: 1993).

IBM: List of IBM Patents or Patent Applications Treated as Related (Appendix P), Nov. 14, 2019, 2 pages.

Pending U.S. Appl. No. 16/675,320, filed Nov. 6, 2019, entitled: "Collaborative Software Development", 25 pages.

Ballman, "SEI CERT C++ Coding Standard", Rules for Developing Safe, Reliable, and Secure Systems in C++, 2016 Edition, Software Engineering Institute, Carnegie Mellon University, Copyright 2017 Carnegie Mellon University, 435 pages.

https://docs.microsoft.com/en-us/visualstudio/ide/create-portable-custom-editor-options?view=vs-2017, "Create portable, custom editor settings with EditorConfig", Jul. 31, 2018, Microsoft Docs, 11 pages.

https://softwareengineering.stackexchange.com/questions/119455/how-to-deal-with-different-programming-styles-in-a-team?rq=1. "How to deal with different programming styles in a team?", Software Engineering, Sponsored by stackoverflow, Accessed on Oct. 18, 2019, 1 page.

Parr et al., "Towards a Universal Code Formatter through Machine Learning", SLE'16, Oct. 31-Nov. 1, 2016, Amsterdam, Netherlands, © 2016 ACM, Abstract, pp. 137-151.

Hattori et al, "Syde: A Tool for Collaborative Software Development", ACM, pp. 235-238 (Year: 2010).

Peng et al, "Collaborative Software Development Platforms for Crowdsourcing", IEEE, pp. 30-36 (Year: 2014).

Treude et al, "Work Item Tagging: Communicating Concerns in Collaborative Software Development", IEEE, pp. 19-34 (Year: 2012).

* cited by examiner

COLLABORATIVE DEVELOPMENT

BACKGROUND

The present invention relates generally to the field of collaborative development, and in particular to a method for defining development rules for a collaborative development project having a plurality of contributors.

In collaborative development projects, different contributors may adhere to different development standards, procedures, styles or practices. Different contributors to a collaborative development project employing different approaches can make it difficult to ensure consistency and/or reliability in the project. To address this issue, it regular reviews may be performed in a collaborative development project in order to check that contributors to the project are following a pre-agreed standard. However, this is time consuming task and may require reformulating of large amounts of contributed work.

SUMMARY

The present invention provides a method for defining development rules for a collaborative development project having a plurality of contributors. The present invention also provides a method for consistency in a collaborative development project having a plurality of contributors. Such methods may be computer-implemented.

The present invention further provides a computer program product including computer program code for implementing a proposed method when executed by a processing unit. The present invention also provides a processing system adapted to execute this computer program code.

The present invention provides a system for defining development rules for a collaborative development project having a plurality of contributors. The present invention yet further provides a system for consistency in a collaborative development project having a plurality of contributors.

According to an aspect of the present invention, there is provided computer-implemented method for defining development rules for a collaborative development project having a plurality of contributors. The method comprises identifying a first contributor of the plurality of contributors as an influencer of the collaborative development project. The method also comprises analyzing contributions of the influencer to a sample project to determine a development characteristic of the influencer. The method further comprises generating one or more development rules based on the determined development characteristic of the influencer.

According to another aspect of the present invention, there is provided a computer-implemented method for consistency in a collaborative development project having a plurality of contributors. The method comprises obtaining one or more development rules for the collaborative development project defined according to a proposed embodiment. The method also includes identifying a second contributor of the plurality of contributors as a follower of the development project. The method further comprises identifying contributions of the follower to the collaborative development project. The method yet further comprises modifying the identified contributions of the follower based on the obtained one or more development rules.

According to another aspect of the present invention, there is provided a computer program product. The computer program product comprises a computer readable storage medium having program instructions embodied therewith, the program instructions executable by a processing unit to cause the processing unit to perform a method according to a proposed embodiment.

According to another aspect of the present invention, there is provided a computer system comprising at least one processor and the computer program product according to an embodiment. At least one processor is adapted to execute the computer program code of said computer program product.

According to yet another aspect of the present invention, there is provided a system for defining development rules for a collaborative development project having a plurality of contributors. The system comprises an identification component configured to identify a first contributor of the plurality of contributors as an influencer of the collaborative development project. The system also comprises an analysis unit configured to analyze contributions of the influencer to a project to determine a development characteristic of the influencer. The system further comprises a rule generator configured to generate one or more development rules based on the determined development characteristic of the influencer.

According to yet another aspect of the present invention, there is provided a system for consistency in a collaborative development project having a plurality of contributors. The system comprises a (sub) system for defining development rules for the collaborative development project according to a proposed embodiment. The identification component is further configured to identify a second contributor of the plurality of contributors as a follower of the development project. The system also comprises a contribution analysis component configured to identify contributions of the follower to the collaborative development project. The system further comprises a modification component configured to modify the identified contributions of the follower based on the obtained one or more development rules.

BRIEF DESCRIPTION OF THE DRAWINGS

Preferred embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In embodiments of the present invention constituting a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Further, a component may be an integration flow that is executed by one or more processing units.

Proposed are embodiments for defining and applying development rules for a collaborative development project having a plurality of contributors. In such concepts, a primary (i.e. lead or principal) contributor of the project may be defined as an influencer, and other contributors to the project may be defined as secondary (i.e. assistant or deputy) contributors, otherwise referred to a followers. Contributions made by the influencer may be analyzed to one or more development characteristics of the influencer. Based on such development characteristics, development rules may be determined. Such rules may then be used to ensure that (new and/or previous) contributions to the project that are made by followers (i.e. non-influencers) are modified so as to ensure that they adhere to the development characteristics of the influencer. In this way, contributions to the collaborative development project may be automatically and dynamically processed and modified so as to ensure consistency with defined procedures, patterns, styles or practices of the influencer, and these may be defined according to contributions made by the influencer. A single, trusted or responsible contributor may therefore be selected and used to influence and/or define the development rules used for a collaborative development project.

It is proposed to automatically and dynamically ensure consistency in a collaborative working environment by using a concept of 'Influencer(s)' and 'Followers'. An Influencer may be defined a defined as a user/individual from whom development rules will be determined. In other words, the development characteristics of an influencer will be used to define development rules which may then be used to ensure consistency in a collaborative project. For instance, the development rules may be used to ensure that (new and/or previous) contributions from by followers (i.e. non-influencers) are made consistent with the contributions from the influencer. A Follower may therefore be defined as a user/individual whose contributions will be made to follow (i.e. be consistent with) the development style, practices, patterns, style, etc. of the influencer.

Proposed embodiments may thus dynamically learn development rules or standards and apply them in a collaborative development project. For instance, contributions to the project may be reformulated according to the rules, and this may be done in real-time (i.e. at the time a contribution is made) and/or retrospectively to previous contributions. For example, program code of a collaborative software development project may be automatically modified and reformulated so as to adhere to software development rules, and such rules may be repeatedly redefined according to contributions made by a primary contributor (i.e. the influencer). In this way, the development rules for a collaborative development project may be changed or adapted by a single, primary contributor. Embodiments for centralized control and/or modification of project development rules for a collaborative development project may therefore be facilitated by proposed embodiments.

By way of example, embodiments may leverage known tools or applications for defining development rules. An example of one such tool/application is CodeBuff. CodeBuff is a tool which is adapted to learn rules from a manually-provided document. CodeBuff may also apply the learnt rules to another document. According to conventional approaches, CodeBuff would have to be manually re-run when a source document is amended in order for new rules to be applied. However, proposed embodiments may avoid this manual and repetitive process. For instance, embodiments may continuously review code contributions provided to a collaborative project and determine who is making the contributions. If it is determined that an influencer (i.e. lead, principal or head) made contributions, the contributions may be processed with the CodeBuff tool and development rules then determined. Further, for any new rules that are determined (i.e. those not already associated with the project), these may be added (e.g. linked, stored or associated) to the project and applied to subsequent contributions. The new rules may also be applied retrospectively to previous contributions so as to ensure that consistency or adherence with all rules is maintained. Embodiments may therefore apply newly determined development rules to retrospective, current, and future code contributions in a dynamic and/or automatic manner.

Accordingly, it will be appreciated that proposed embodiments may provide the following benefits:

Speed up collaborative development—for example, embodiments may remove a need for input refinement after input are contributed for the first time;

Automatic adherence to a preferred convention and/or style—Embodiments may ensure that all contributions follow the same convention, and this need not necessarily have to be a known standard or format;

Improved scalability—Embodiments may be highly scalable. For instance, they may be applied at an enterprise and/or a single project level.

Support Remote working—Collaborative working whilst ensuring contribution consistency is supported by embodiments, thus facilitating collaboration between multiple contributors across various locations.

Learning Support—Embodiments may help junior/trainee project contributors obtain experience with more advanced contributors without the advanced contributor necessarily having to provide close supervision.

By way of example, proposed embodiments may provide a computer-implemented method for defining development rules for a collaborative development project having a plurality of contributors. The method may comprise identifying a first contributor of the plurality of contributors as an influencer of the collaborative development project. The method may then further comprise analyzing contributions of the influencer to a sample project so to determine a development characteristic of the influencer. One or more development rules may then be generated based on the determined development characteristic of the influencer. Content of the project may then be aligned with the development rules. This may entail altering or adapting some of the content to reflect new rules and/or rule changes. However, if the content is determined to adhere to the rules, the content may remain unchanged. Such embodiments may therefore dynamically and automatically ensure that content of a collaborative project adheres to formats, styles, patterns, standards or practices set by the influencer (i.e. lead contributor).

Some embodiments may also comprise associating the determined one or more development rules with the collaborative development project. In this way, development rules defined specifically for the collaborative development project may be connected to the project and thus be made available for subsequent use in relation to the project.

By way of example, determining one or more development rules may comprise using a tool or application such as CodeBuff. Embodiments may therefore make use of conventional tools, rather than requiring proprietary components to be developed. This may reduce an associated cost and/or complexity of proposed embodiments.

A development characteristic of the influencer may comprise at least one of: cognitive characteristics; syntax styles; and language patterns.

The collaborative development project may or may not comprise the sample project. Some embodiments may therefore leverage a large collection of other sample projects (such as old/legacy projects) in order to identify development characteristics of the influencer. However, it will be understood that proposed embodiments may also support the collaborative development project itself being analyzed to identify a development characteristic of the influencer. Proposed embodiments therefore support learning from a wide/large range of sources, thus facilitating improved learning and improved development rule generation.

An embodiment may further comprise: analyzing a (subsequent or previous) contribution to determine if the contribution adheres to the determined one or more development rules. Responsive to determining the contribution does not adhere to the determined one or more development rules, a warning notification may then be generated. For instance, if, as a contributor is writing new content, a contradiction between the content and the rules is determined (e.g. differing formatting conventions), it may be indicated to the contributor (e.g. in a similar way to a spelling or compilation error). For example, two or more contradicting lines of content may be automatically detected and communicated to the contributor.

Further, such embodiments may also comprise determining a response of the influencer to the generated warning notification. The determined one or more development rules may then be modified (e.g. updated or refined) based on the determined response of the influencer. For instance, if there is a deliberate reason for the contradiction in the new content in the example of the paragraph above, the influencer may indicate this, and a new rule can be defined to take account of the influencer's response.

Some embodiments may also comprise, responsive to determining a contributor is not the influencer, analyzing the contribution to determine if the contribution adheres to the determined one or more development rules. Then, responsive to determining the contribution does not adhere to the determined one or more development rules, the contribution may be modified based on the determined one or more development rules. By way of example, modifying the contribution may comprise: employing artificial intelligence and natural language processing techniques to suggest changes to text based on development rules. A grammar and/or spellcheck tool of a word processor is an example a tool which can analyze written content and suggest changes according to predefined rules. Other tools/applications that currently exist for modifying content according to predetermined rules include Grammarly™ and Smart Compose™.

Analyzing contributions of the influencer to a sample project may comprise processing, with a natural language processing algorithm, content of the project created by the influencer. In some embodiments, contributions of the influencer to a sample project may comprise processing with a machine learning algorithm, content of the project created by the influencer. In this way, un-supervised or supervised learning concepts may be leveraged. Embodiments may therefore employ one or more of a wide range of existing algorithms to process and analyze influencer contributions. In this way, implementation cost and/or complexity may be reduced.

Some embodiments may also include identifying a second contributor of the plurality of contributors as a follower of the development project. A hierarchical representation of the plurality of contributors of the collaborative development project may then be generated. In the hierarchical representation, the second contributor may be a subordinate of the first contributor such that the follower is a subordinate of the influencer. Further, the generated hierarchical representation may be associated with the collaborative development project. In this way, hierarchical relationships between contributors to the project may be defined specifically for the collaborative development project. These hierarchical relationships may be connected to the project and thus be made available for subsequent use in relation to the project.

In proposed embodiments, at least one influencer and follower may be specified within a hierarchy. As the influencer performs his/her work, embodiments may determine development rules by analyzing the work of the influencer. These rules may then be associated with the project and/or added to a rule library. The development rules for a project may then be applied to any project contributions made by a follower. For example, if the influencer of a project is writing document content for the project, a universal document formatter can be used to determine syntax and formatting rules from the new document content. These rules may then be dynamically applied to any content provided to the project by a follower.

Embodiments may therefore employ a hierarchy to determine which followers determined development rules should be applied to. It may thus operate on a one-to-many relationship in that an influencer can have many followers, but a follower will only have one direct influencer. Furthermore, an influencer can have a direct influencer too, in which case it is both an influencer (looking down the hierarchy) and a follower (looking up the hierarchy).

Embodiments may be implemented in conjunction with an existing collaborative development environment or application. In this way, the functionalities and/or utility of collaborative development environments/applications may be improved upon by incorporating proposed embodiments.

Figure 1:
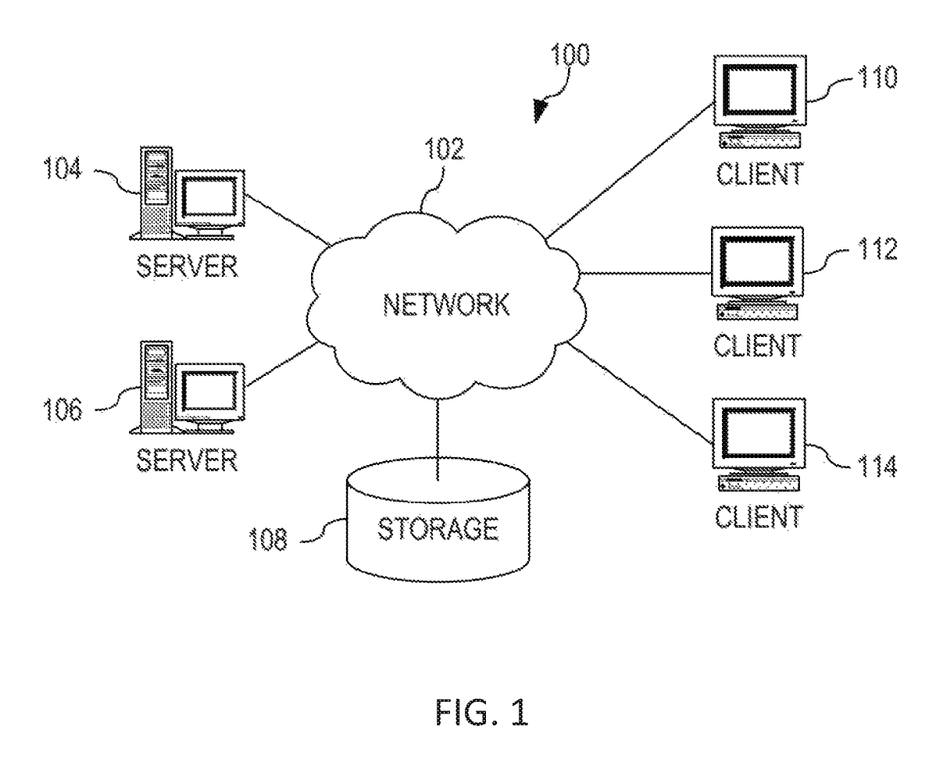
FIG. 1 depicts an example distributed system in which aspects of the illustrative embodiments may be implemented.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Those of ordinary skill in the art will appreciate that the architecture and/or hardware in FIG. 1 may vary depending on the implementation. Also, the processes of the illustrative embodiments may be applied to a multiprocessor data processing system, without departing from the scope of the present invention.

As detailed above, proposed embodiments provide a method and system for defining development rules for a collaborative development project having a plurality of contributors. By way of further explanation, a proposed embodiment will now be described with respect to distributed communication system including a server hosting a collaborative development application.

Figure 2:
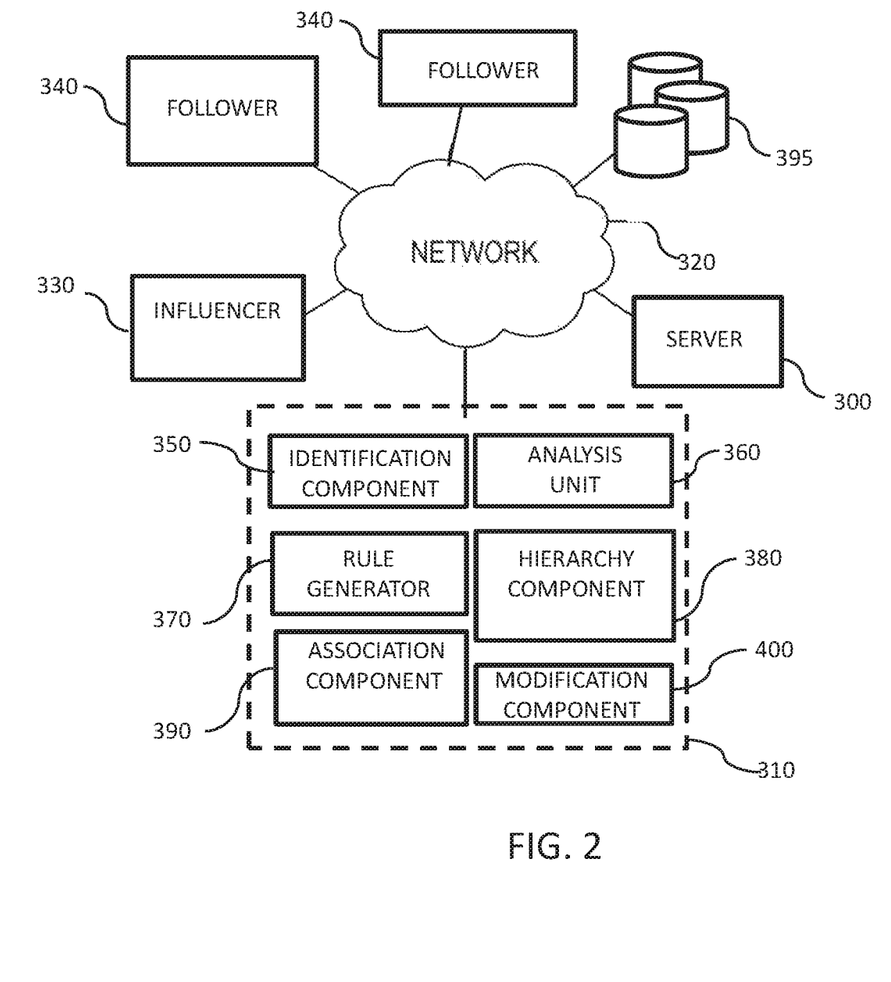
FIG. 2 is a schematic diagram of a proposed distributed communication system according to an embodiment.

Referring to FIG. 2, there is depicted a schematic diagram of a proposed distributed communication system according to an embodiment. The communication system includes a sever 300 (which hosts the collaborative development application) and a system 310 for defining development rules for a collaborative development project according to an embodiment. The server 300 can be accessed by a plurality of contributors via a communication network 320 (e.g. the Internet). Here, the plurality of contributors comprises an influencer 330 (i.e. lead, head or principal contributor) and two followers 340 (i.e. secondary or non-primary contributors). By way of example only, the influencer 330 is a highly experienced designer assigned to lead/manage a team responsible for implementing the collaborative development project, and the followers 340 are team members with less design development experience than the influencer 330. The plurality of contributors communicate with the server 300 in order to design, create and modify project content in the collaborative development application.

In the depicted example of FIG. 2, the system 310 for defining development rules is a middleware system 310 that is intercepts, monitors and controls communications between the plurality of contributors and the server 300.

The system 310 comprises an identification component 350 that identifies a first contributor of the plurality of contributors as an influencer of the collaborative development project.

The system 310 also comprises an analysis unit 360. The analysis unit 360 analyzes contributions of the influencer to a project to determine a development characteristic of the influencer. For example, the analysis unit 360 determines at least one of: cognitive characteristics; syntax styles; language patterns; and design policies of the influencer. In embodiment, the analysis unit processes content of the project created by the influencer with a natural language processing algorithm and a machine learning algorithm. By way of example, for written content, there are known tools which employ natural language processing and machine learning to extract patterns and determine the style of writing. Also, a naive Bayesian machine learning process may be employed.

Based on the determined development characteristic of the influencer, a rule generator 370 of the system 310 generates one or more development rules. By way of example, the rule component 370 of this embodiment employs the known tool/application typically referred to as CodeBuff to determine development rules. As detailed above, other tools which employ natural language processing and machine learning to extract patterns and determine rules are widely known.

The system 310 also includes a hierarchy component 380 that generates a hierarchical representation of the plurality of contributors 330, 340. In doing so, the follower 340 are made subordinate of the influencer 330 in the hierarchical representation.

In this example of FIG. 2, the system 310 also comprises an association component 390 that associates the hierarchical representation and the determined development rules with the collaborative development project. Information about this association is stored in a remotely located database 395 that is accessible via the communication network 320. In this way, information about collaborative software development projects and their associated contributor and development rules may be stored in and retrieved from an accessible database 395.

Even yet further, the system 310 of this example includes a modification component 400 that is modifies identified contributions of a follower 340 based on the obtained one or more development rules.

By way of example, we will now consider an exemplary use of a proposed embodiment, wherein a user of a collaborative development system assigns influencers and followers for a project within a collaborative environment.

The environment monitors the influencer's work and dynamically learns his/her style of writing and adds rules relating to the style to the Rule Library of the collaborative environment. For a collaborative coding project, such rules may relate to coding standards and/or how code is formatted and structured. For a collaborative writing project, such rules may relate to sentence structure, complexity of words, length of sentences, formatting etc.

Each time the influencer provides a contribution to the project, the new addition(s) is/are processed to identify development characteristics and determine development rules.

When a follower contributes to the project, his/her addition(s) is/are assessed against the development rules for the project and reformatted accordingly so as to adhere to the development rules (and thus be consistent with the influencer's contributions).

Figure 3:
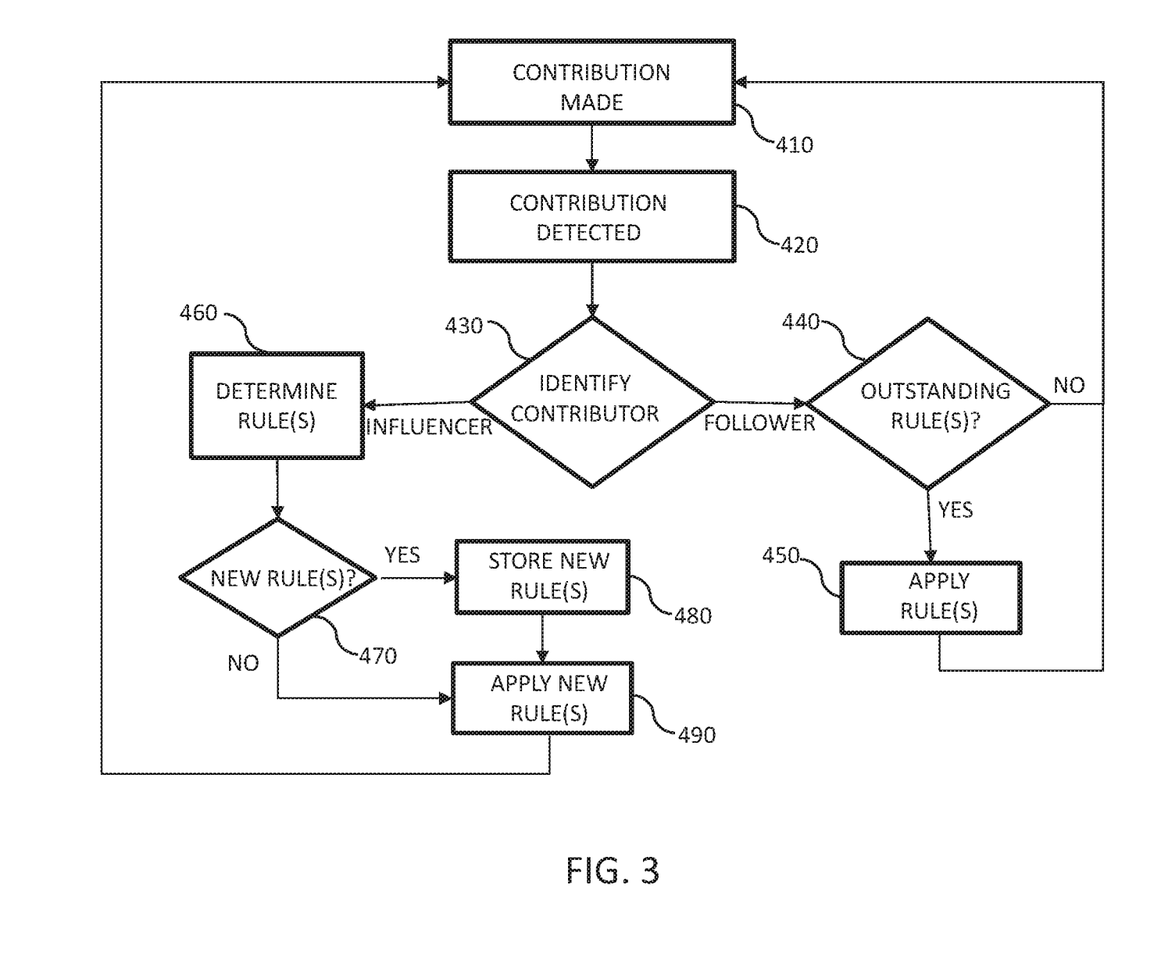
FIG. 3 is flow diagram of a method for defining development rules for a collaborative development project having a plurality of contributors according to an embodiment.

By way of further explanation and illustration of the proposed concepts, we will now consider an exemplary use of an embodiment with reference to FIG. 3.

FIG. 3 is a simplified flow diagram of a method for defining development rules for a collaborative development project having a plurality of contributors according to an embodiment of the invention. In this example, a first user is assigned the position of influencer (i.e. lead contributor) of the collaborative development project. All other team members are assigned the position of follower (i.e. secondary contributors).

The method, running within a development environment, monitors for contributions to the project. When a contribution is made (step 410), the contribution to the project is detected in step 420 and the method proceeds to step 430. In step 430, it is determined if the contributor of the contribution is the influencer or a follower.

If, in step 430, it is determined that the contributor of the contribution is a follower, the method proceeds to step 440 in which it is determined if there are any outstanding development rules for the project. If no rules are outstanding, the method returns to step 410 to monitor for a new contribution to the project. Conversely, if one or more rules are outstanding, the method proceeds to step 450 in which the rules are applied to the contribution (e.g. using the CodeBuff tool) so as to ensure the contribution adheres to the rule(s).

If, in step 430, it is determined that the contributor of the contribution is the influencer, the method proceeds to step 460. In step 460, the contribution of the influencer is processed to determine a development characteristic of the influencer (e.g. cognitive characteristic, syntax style, language pattern, formatting policy, etc.) and, based on the development characteristic, one or more development rules are determined. Next, it is determined in step 470 whether or not the determined rule(s) are already stored in relation to (i.e. associated with) the project (e.g. stored in a 'rulebook' within the collaboration space). In other words, it is determined in step 470 whether or not the determined rules are new.

If the determined rule(s) already exist for the project, the method proceeds to step 490 in which they applied to the content of the project. For this, the CodeBuff tool is used to apply the new rule(s) to the content of the project.

If the determined rule(s) do not already exist for the project, the method proceeds to step 480 in which the new rule(s) is/are stored in relation with the project, after which the method proceeds to step 490 and applied the new rule(s) to the code of the project.

After completion of step 490, the method returns to step 410 to once again monitor for a new contribution to the project.

By way of example, the content of the project may be reprocessed each time a contributor provides new content (e.g. enters a new line, adds a new graphical element, completes a new entry, etc.) so as to avoid excessive computation.

To illustrate the above described method, one may consider an assistant (i.e. follower) working on the project alongside a lead coder (i.e. influencer) to deliver a software development project by an urgent deadline. Although the code that assistant contributes may be valid, it may not be formatted consistently with the rest of the source code that was contributed by the lead coder.

As the assistant contributes new code for the project, every time he/she presses enter (or confirms entry of a new contribution via a button or interface element for example), the new code is detected and assessed and reformulated to be in line with the established rules for the project, so as to ensure the code is consistent. If the assistant contributes lines of code that haven't been defined in the rulebook it will stay the same. However, if the lead coder (i.e. influencer) later writes code that establishes a new rule that is relevant to this previous code, then the assistant's earlier-provided code will automatically be modified to adhere to the new rule.

Figure 4:
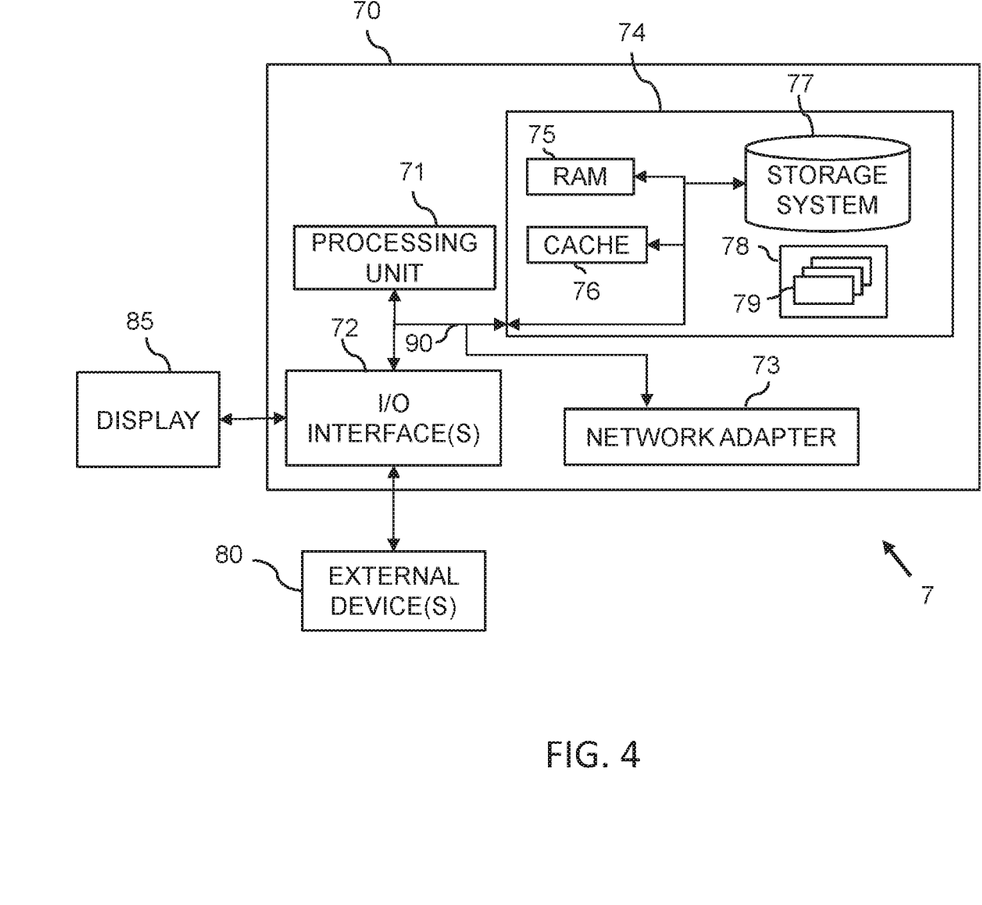
FIG. 4 illustrates a system according to another embodiment.

Embodiments may comprise a computer system 70, which may form part of a networked system 7 illustrated in FIG. 4. For instance, a rule generator determines one or more development rules based on development characteristics of a project influencer according to an embodiment may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that carry out the functions of proposed embodiments. For instance, the memory 74 may include a computer program product having program executable by the processing unit 71 to cause the Input/Output (I/O) interface 72 perform a method for defining development rules for a collaborative development project according to a proposed embodiment. Program/utility 78, having a set (at least one) of program modules 79, may be stored in memory 74. Program modules 79 generally carry out the functions and/or methodologies of proposed embodiments for partial write operations to memory.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined development rules to devices of a distributed network).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

identifying one or more influencers and one or more corresponding followers, amongst a plurality of contributors of a collaborative development project, wherein a hierarchy is used to identify the one or more influencers and the one or more corresponding followers, and wherein the one or more corresponding followers have only one influencer;

analyzing a contribution of the one or more influencers, wherein the contribution comprises at least one of one or more cognitive characteristics, one or more syntax styles, and one or more language patterns of program code within the collaborative development project wherein analyzing the contribution of the one or more influencers comprises:

processing, with a machine learning algorithm, the contribution of the one or more influencers within the collaborative development project;

learning, dynamically, a set of software development rules to apply within the collaborative development project, based on the contribution of the one or more influencers;

utilizing a universal code formatter known as CodeBuff to determine the set of software development rules to apply within the collaborative development project;

reformulating, dynamically, the set of software development rules based on the contribution of the one or more influencers;

leveraging a large collection of other sample projects to identify development characteristics of the one or more influencers;

storing, in the collaborative development project, the reformulated set of software development rules, based on the contributed program code of the one or more influencers, that are not previously stored as rules;

identifying a second contribution from the one or more corresponding followers within the collaborative development project, wherein the second contribution comprises cognitive characteristics, syntax styles, and language patterns of program code within the collaborative development project;

assessing the second contribution, from the one or more corresponding followers, against the stored set of software development rules;

determining that the identified second contribution from the one or more corresponding followers, within the hierarchy, does not adhere to the stored set of software development rules within the collaborative development project; and modifying, automatically, the identified second contribution of the one or more corresponding followers with the reformulated set of software development rules, based on the contributed program code of the one or more influencers.

2. The method of claim 1, wherein analyzing the contribution of the one or more influencers comprises:

processing, with a natural language processing algorithm, the contribution of the one or more influencers within the collaborative development project.

3. The method of claim 1, further comprising:

associating the determined set of rules with the collaborative development project.

4. The method of claim 1, wherein the collaborative development project comprises a sample project.

5. The method of claim 1, wherein determining the set of rules comprises:

processing the contribution of the one or more influencers with at least one of a natural language processing algorithm and a machine learning algorithm.

6. The method of claim 1, further comprising:

generating a hierarchical representation of the plurality of contributors of the collaborative development project, wherein the one or more followers are one or more subordinates to the one or more influencers in the hierarchical representation of the plurality of contributors.

7. The method of claim 6, wherein the generated hierarchical representation depicts which of the one or more followers the determined set of rules are to be applied; and wherein the one or more influencers can have a plurality of followers and the one or more followers can have only one influencer.

8. The method of claim 1, further comprising:

analyzing the second contribution of the one or more followers to determine if the second contribution adheres to the determined set of rules; and responsive to determining that the second contribution does not adhere to the determined set of rules, generating a warning notification; and notifying the one or more followers that the second contribution does not adhere to the determined set of rules within the collaborative development project.

9. The method of claim 8, further comprising:

receiving a response of the one or more influencers to the generated warning notification; and modifying the determined set of rules based on the received response of the one or more influencers.

10. A computer program product for defining development rules for a collaborative development project having a plurality of contributors, wherein the computer program product comprises a computer readable storage medium having program instructions embodied therewith, the program instructions executable by a processing unit to cause the processing unit to perform a method comprising:

identifying one or more influencers and one or more corresponding followers, amongst a plurality of contributors of a collaborative development project, wherein a hierarchy is used to identify the one or more influencers and the one or more corresponding followers, and wherein the one or more corresponding followers have only one influencer;

analyzing a contribution of the one or more influencers, wherein the contribution comprises at least one of one or more cognitive characteristics, one or more syntax styles, and one or more language patterns of program code within the collaborative development project wherein analyzing the contribution of the one or more influencers comprises:

processing, with a machine learning algorithm, the contribution of the one or more influencers within the collaborative development project;

learning, dynamically, a set of software development rules to apply within the collaborative development project, based on the contribution of the one or more influencers;

utilizing a universal code formatter known as CodeBuff to determine the set of software development rules to apply within the collaborative development project;

reformulating, dynamically, the set of software development rules based on the contribution of the one or more influencers;

leveraging a large collection of other sample projects to identify development characteristics of the one or more influencers;

storing, in the collaborative development project, the reformulated set of software development rules, based on the contributed program code of the one or more influencers, that are not previously stored as rules;

identifying a second contribution from the one or more corresponding followers within the collaborative development project, wherein the second contribution comprises cognitive characteristics, syntax styles, and language patterns of program code within the collaborative development project;

assessing the second contribution, from the one or more corresponding followers, against the stored set of software development rules;

determining that the identified second contribution from the one or more corresponding followers, within the hierarchy, does not adhere to the stored set of software development rules within the collaborative development project; and modifying, automatically, the identified second contribution of the one or more corresponding followers with the reformulated set of software development rules, based on the contributed program code of the one or more influencers.

11. The computer program product of claim 10, further comprising:

generating a hierarchical representation of the plurality of contributors of the collaborative development project, wherein the one or more followers are one or more subordinates to the one or more influencers in the hierarchical representation of the plurality of contributors.

12. The computer program product of claim 11, wherein the generated hierarchical representation depicts which of the one or more followers the determined set of rules are to be applied; and wherein the one or more influencers can have a plurality of followers and the one or more followers can have only one influencer.

13. The computer program product of claim 10, further comprising:

processing the contribution of the one or more influencers with at least one of a natural language processing algorithm and a machine learning algorithm.

14. A computer program product of claim 10, further comprising:

analyzing the second contribution of the one or more followers to determine if the second contribution adheres to the determined set of rules; and responsive to determining that the second contribution does not adhere to the determined set of rules, generating a warning notification; and notifying the one or more followers that the second contribution does not adhere to the determined set of rules within the collaborative development project.

15. A system for defining development rules for a collaborative development project having a plurality of contributors, the system comprising one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

identifying one or more influencers and one or more corresponding followers, amongst a plurality of contributors of a collaborative development project, wherein a hierarchy is used to identify the one or more influencers and the one or more corresponding followers, and wherein the one or more corresponding followers have only one influencer;

analyzing a contribution of the one or more influencers, wherein the contribution comprises at least one of one or more cognitive characteristics, one or more syntax styles, and one or more language patterns of program code within the collaborative development project wherein analyzing the contribution of the one or more influencers comprises:

processing, with a machine learning algorithm, the contribution of the one or more influencers within the collaborative development project;

learning, dynamically, a set of software development rules to apply within the collaborative development project, based on the contribution of the one or more influencers;

utilizing a universal code formatter known as CodeBuff to determine the set of software development rules to apply within the collaborative development project;

reformulating, dynamically, the set of software development rules based on the contribution of the one or more influencers;

leveraging a large collection of other sample projects to identify development characteristics of the one or more influencers;

storing, in the collaborative development project, the reformulated set of software development rules, based on the contributed program code of the one or more influencers, that are not previously stored as rules;

identifying a second contribution from the one or more corresponding followers within the collaborative development project, wherein the second contribution comprises cognitive characteristics, syntax styles, and language patterns of program code within the collaborative development project;

assessing the second contribution, from the one or more corresponding followers, against the stored set of software development rules;

determining that the identified second contribution from the one or more corresponding followers, within the hierarchy, does not adhere to the stored set of software development rules within the collaborative development project; and modifying, automatically, the identified second contribution of the one or more corresponding followers with the reformulated set of software development rules, based on the contributed program code of the one or more influencers.

16. The system of claim 15, further comprising:

associating the determined set of rules with the collaborative development project.

17. The system of claim 16, further comprising:

generating a hierarchical representation of the plurality of contributors of the collaborative development project, wherein the one or more followers are one or more subordinates to the one or more influencers in the hierarchical representation of the plurality of contributors.

18. The system of claim 16, wherein the generated hierarchical representation depicts which of the one or more followers the determined set of rules are to be applied; and wherein the one or more influencers can have a plurality of followers and the one or more followers can have only one influencer.

* * * * *